United States Patent
Sawahata et al.

(10) Patent No.: US 10,549,615 B2
(45) Date of Patent: Feb. 4, 2020

(54) COVER ATTACHMENT STRUCTURE

(71) Applicant: WEBASTO JAPAN CO., LTD., Higashihiroshima-shi, Hiroshima (JP)

(72) Inventors: Koji Sawahata, Higashihiroshima (JP); Takeshi Mizoguchi, Higashihiroshima (JP)

(73) Assignee: WEBASTO JAPAN CO., LTD., Higashihiroshima (JP)

( * ) Notice: Subject to any disclaimer, the term of this patent is extended or adjusted under 35 U.S.C. 154(b) by 0 days.

(21) Appl. No.: 16/084,909

(22) PCT Filed: Feb. 27, 2017

(86) PCT No.: PCT/JP2017/007535
§ 371 (c)(1),
(2) Date: Sep. 13, 2018

(87) PCT Pub. No.: WO2017/159328
PCT Pub. Date: Sep. 21, 2017

(65) Prior Publication Data
US 2019/0077237 A1    Mar. 14, 2019

(30) Foreign Application Priority Data
Mar. 18, 2016    (JP) ................. 2016-055669

(51) Int. Cl.
*B60J 7/14*    (2006.01)
*F16B 5/02*    (2006.01)
*F16B 5/04*    (2006.01)

(52) U.S. Cl.
CPC .......... *B60J 7/143* (2013.01); *B60J 7/145* (2013.01); *F16B 5/0208* (2013.01); *F16B 5/04* (2013.01)

(58) Field of Classification Search
CPC ....... B60J 7/12; B60J 7/14; B60J 7/143; B60J 7/145
USPC ............................................ 296/108, 107.17
See application file for complete search history.

(56) References Cited

U.S. PATENT DOCUMENTS

| | | | | |
|---|---|---|---|---|
| 2,746,747 A | * | 5/1956 | Lautenbach | .......... E05F 11/382 49/227 |
| 3,411,821 A | * | 11/1968 | Adamski | ................ B60J 7/1265 296/117 |
| 2010/0283286 A1 | | 11/2010 | Odoi et al. | |

FOREIGN PATENT DOCUMENTS

| JP | 2007-261412 A | 10/2007 |
|---|---|---|
| JP | 2007-320334 A | 12/2007 |

* cited by examiner

*Primary Examiner* — Dennis H Pedder
(74) *Attorney, Agent, or Firm* — Maschoff Brennan (57) ABSTRACT

Disclosed is a structure of a cover which allows a first link 25 to be pivotally coupled to a front roof panel via a stepped rivet 27, and a cover 31 to be pivotally coupled to the stepped rivet 27 via a first stepped screw 33. An overhang portion 27e of the stepped rivet 27 is joined to the front roof panel with a periphery of a front attachment hole 23c of the front roof panel being sandwiched between the overhang portion 27e and a large diameter portion 27c inserted in an insertion hole 25a of the first link 25 to pivotally support the first link 25. The first stepped screw 33 has a threaded portion 33d fastened into a fastening hole 27f of the stepped rivet 27, and a base end 33c inserted in a first through hole 31b of the cover 31 to pivotally support the cover 31.

1 Claim, 7 Drawing Sheets

COVER ATTACHMENT STRUCTURE

TECHNICAL FIELD

The present invention is useful as a structure of a cover which is attached to, and covers a link pivotally coupled to a roof panel which opens and closes the top of a cabin of a convertible.

BACKGROUND ART

According to Patent Document 1, a cover is attached to, and covers a link pivotally coupled to a roof panel which opens and closes a top of a cabin of a convertible for the purpose of improving the appearance.

CITATION LIST

Patent Document

[Patent Document 1] Japanese Unexamined Patent Publication No. 2007-261412

SUMMARY OF THE INVENTION

Technical Problem

In the structure as disclosed by Patent Document 1, the cover can be attached to the link by fastening or fitting via a tab at a position away from the joint between the link and the roof panel. However, if the link is configured to come close to other components while the roof panel is opening or closing, space cannot be kept for a fastener or the tab. Thus, the cover cannot be attached to the link with stability in some cases.

Moreover, the fastener or the tab may be exposed inside the cabin to become obtrusive, which may impair the appearance of the cover and its periphery.

In view of the foregoing, the present invention has been achieved to facilitate stable attachment of a cover to a link, and improve the appearance of the cover and its periphery.

Solution to the Problem

A first aspect of the present invention is directed to a structure of a cover which is attached to, and covers, a link pivotally coupled to a roof panel which opens and closes a top of a cabin of a convertible. In this structure, an attachment hole is formed through the roof panel, an insertion hole is formed through an end of the link, a through hole is formed through an end of the cover, the link is pivotally coupled to the roof panel via a stepped rivet, and the cover is pivotally coupled to the stepped rivet via a stepped screw, the stepped rivet includes a head, and a shaft having a large diameter portion, a small diameter portion, and an overhang portion, the smaller diameter portion having a smaller diameter than the large diameter portion and being located across the large diameter portion from the head, the overhang portion jutting out of a tip end of the small diameter portion, the head being provided with a fastening hole formed in a surface thereof facing opposite to the shaft, the stepped screw has a shaft including a base end, and a threaded portion located across the base end from the head, the threaded portion having a smaller diameter than the base end, the overhang portion of the stepped rivet is joined to the roof panel with a periphery of the attachment hole of the roof panel being sandwiched between the overhang portion and the large diameter portion, and the large diameter portion being inserted in the insertion hole of the link to pivotally support the link, and the threaded portion of the stepped screw is fastened into the fastening hole of the stepped rivet, and the base end of the stepped screw is inserted in the through hole of the cover to pivotally support the cover.

In this configuration, the cover is coupled to the link at the joint between the link and the roof panel. Thus, the cover can be attached to the link more stably and easily than the case where the cover is attached to the link only at a point away from the joint between the link and the roof panel.

Further, this configuration can reduce the point of attachment of the cover to the link except for the joint between the link and the roof panel, thereby reducing the number of fasteners exposed inside the cabin. This can improve the appearance of the cover and its periphery.

Advantages of the Invention

The present invention can facilitate stable attachment of the cover to the link, and can improve the appearance of the cover and its periphery.

DETAILED DESCRIPTION

Embodiments of the present invention will be described in detail below with reference to the drawings. Note that the following description of embodiments is merely examples in nature, and is not intended to limit the scope, application, or uses of the present invention.

Figure 1:
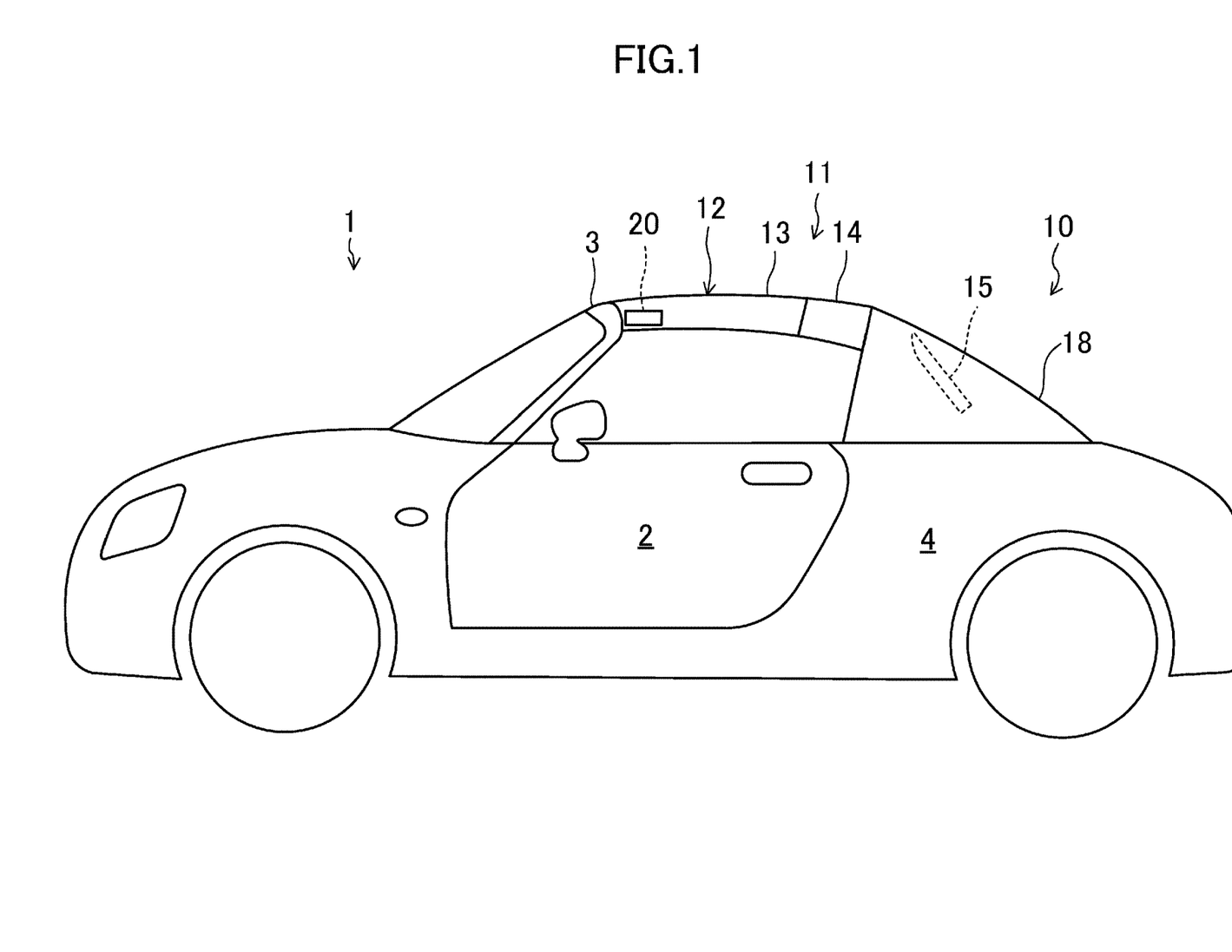
FIG. 1 is a schematic side view illustrating a general configuration of a vehicle to which a cover structure of an embodiment is applied, with a cabin being closed.
Figure 2:
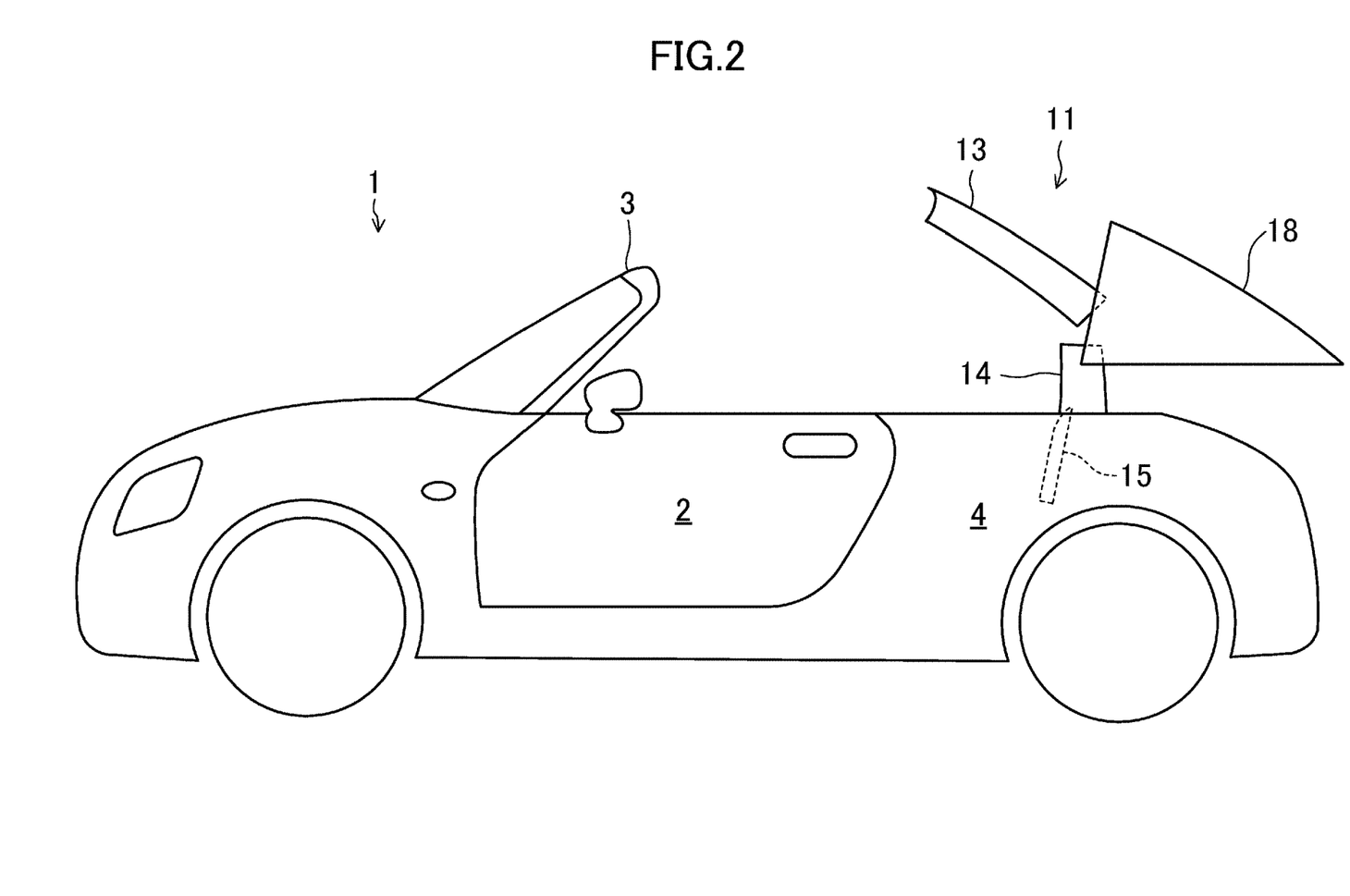
FIG. 2 is a schematic side view illustrating the general configuration of the vehicle to which the cover structure of the embodiment is applied, with a retractable roof being located between a use position and a retracted position, and a deck cover being at a retreated position.
Figure 3:
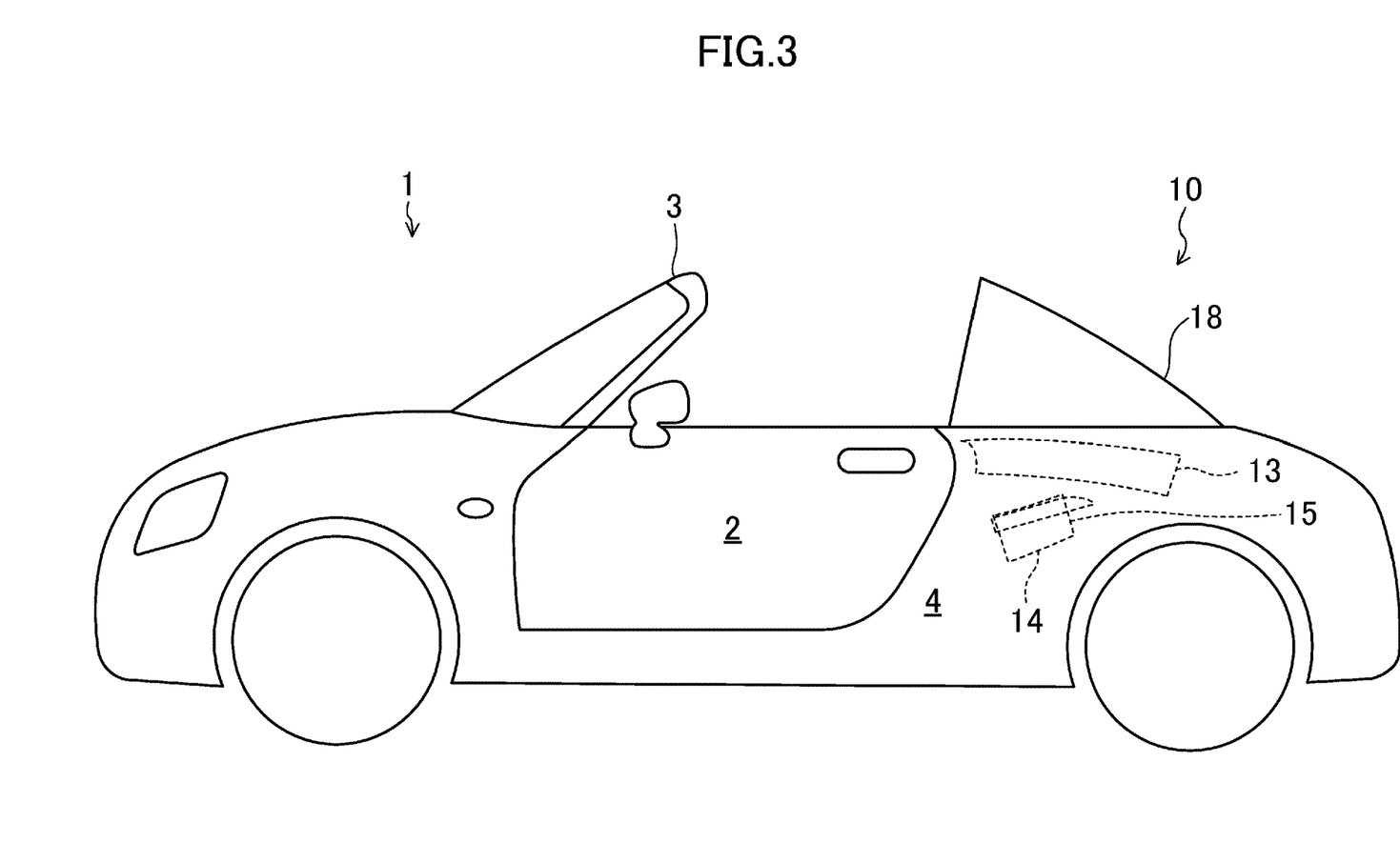
FIG. 3 is a schematic side view illustrating the general configuration of the vehicle to which the cover structure of the embodiment is applied, with the cabin being open.

A vehicle 1 of this embodiment shown in FIGS. 1 to 3 is a convertible, and equipped with an opening/closing mechanism 10. The opening/closing mechanism 10 is switchable between a closed state where a roof member 12 covers the top of a cabin 2, and an open state where the top of the cabin 2 is uncovered. The opening/closing mechanism 10 includes a retractable roof 11, a deck cover 18, and a lock mechanism 20. First, it will be described below the configurations of these components basically in a state where the cabin 2 is closed (the state shown in FIG. 1).

<Retractable Roof>

The retractable roof 11 includes a roof member 12, and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13, and a middle roof panel 14 disposed behind the front roof panel 13. The back window 15 is a transparent member, and disposed above a storage 4 formed in a rear portion of the vehicle 1.

The retractable roof 11 is driven by a roof drive mechanism (not shown). Specifically, the roof drive mechanism includes a first drive motor, and a first link mechanism which links the first drive motor and the retractable roof 11 together. The first link mechanism transfers rotational power of the first drive motor to the front roof panel 13, the middle roof panel 14, and the back window 15. Thus, the retractable roof 11 is movable between a use position (shown in FIG. 1) and a retracted position (shown in FIG. 3). The retractable roof 11 in the use position is located outside the storage 4 to cover the cabin 2. The retractable roof 11 in the retracted position is retracted into the storage 4, thereby uncovering the cabin 2.

Figure 4:
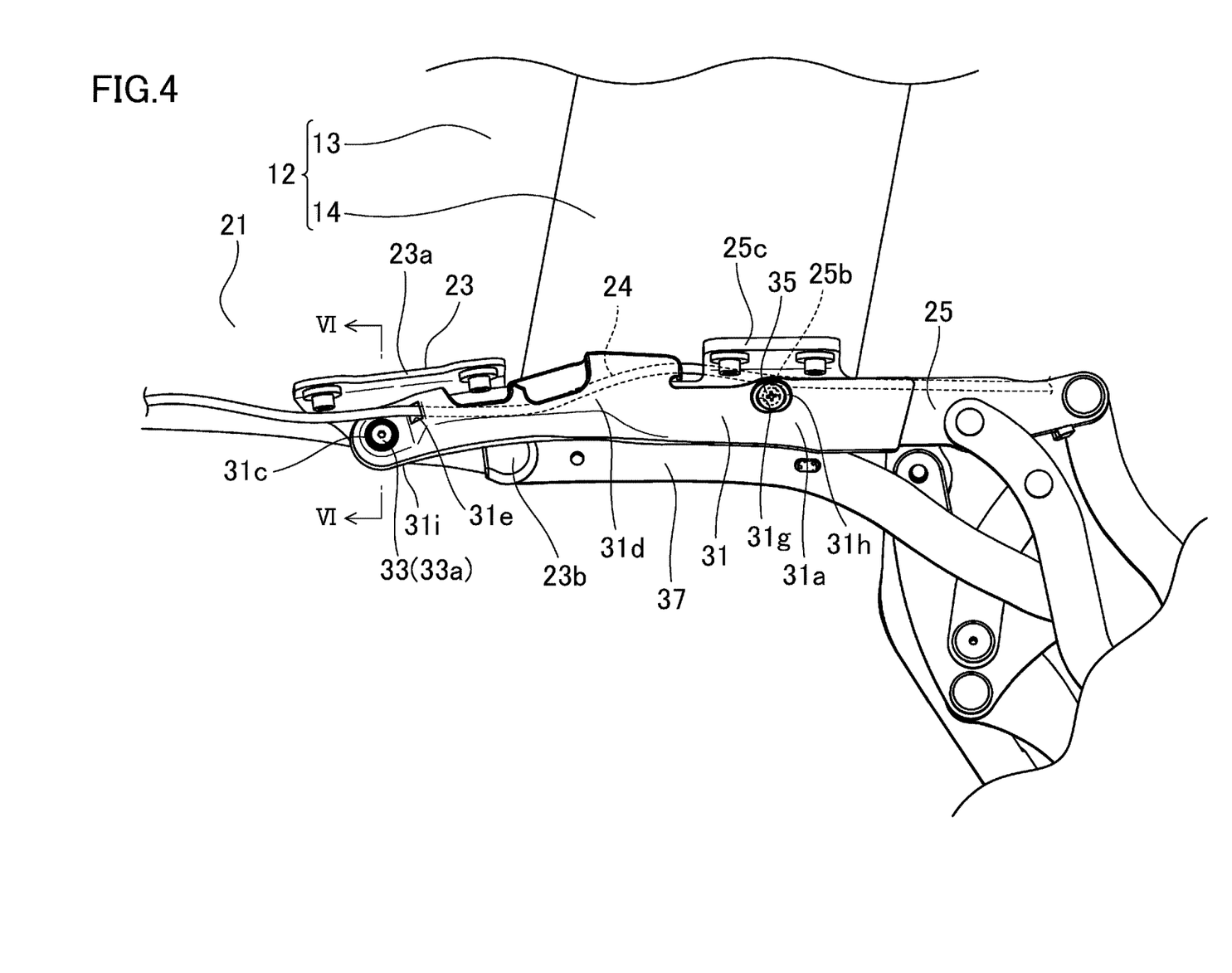
FIG. 4 is a perspective view illustrating a right rear end of a roof member and its periphery.
Figure 5:
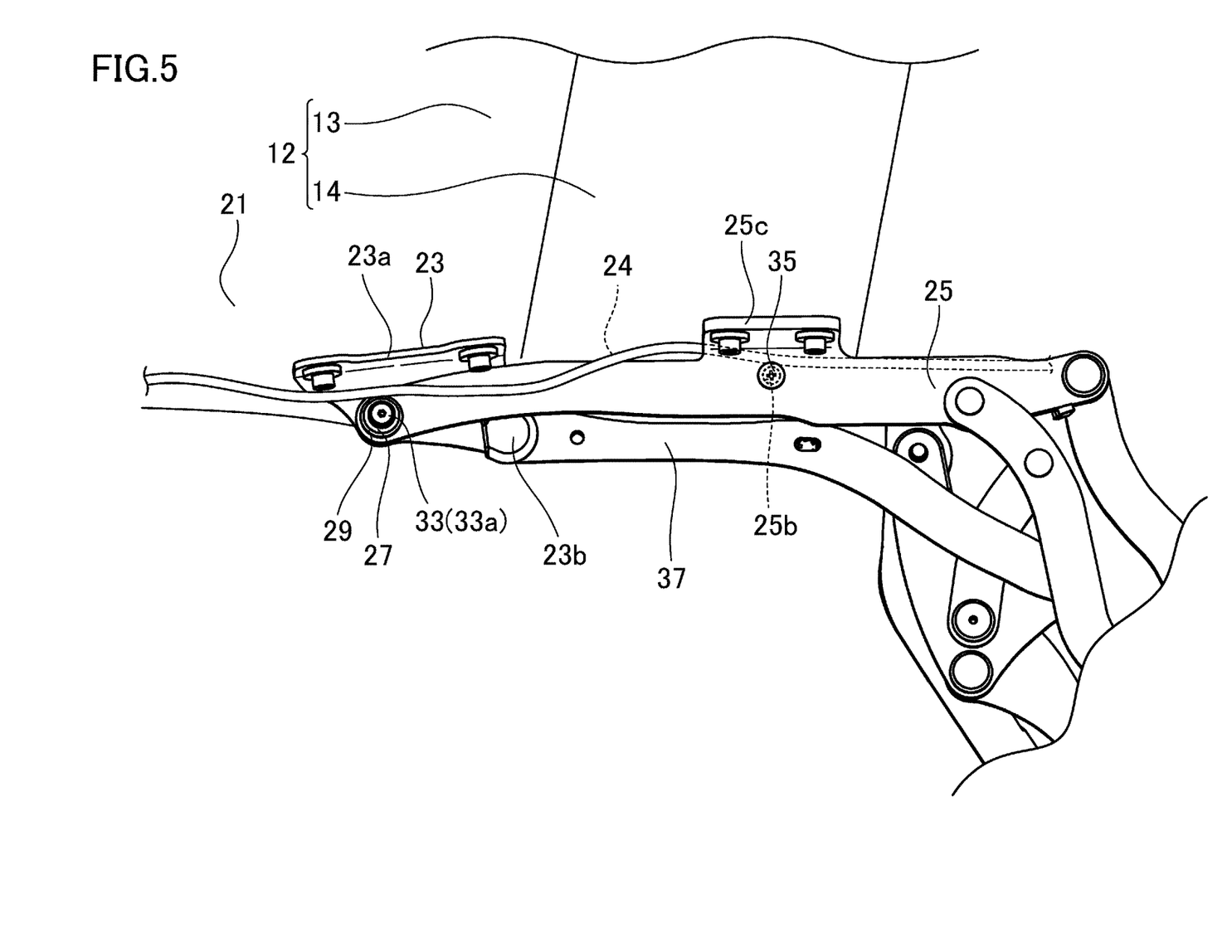
FIG. 5 is a view corresponding to FIG. 4, with a cover being removed.

The front roof panel 13 includes, as shown in FIGS. 4 and 5, a panel body 21, which is a main body thereof, and a coupling bracket 23 fastened to both ends, in a vehicle width direction, of a rear end of the panel body 21. The coupling bracket 23 includes a plate-like fastening portion 23a and a plate-like coupling portion 23b. The fastening portion 23a is fastened to a rear surface of the panel body 21 with its face oriented toward the panel body 21. The coupling portion 23b protrudes in a direction away from the panel body 21 from an outer edge, in the vehicle width direction, of the fastening plate 23a with its face oriented in the vehicle width direction. The coupling portion 23b is provided with a front attachment hole 23c (see FIG. 6) formed through a front end thereof, and a rear attachment hole (not shown) formed in a rear end thereof. The rear attachment hole has a closed bottom and opens toward the outside in the vehicle width direction.

<Deck Cover>

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame (not shown) to be fitted with the back window 15.

The deck cover 18 is driven by a deck drive mechanism (not shown). Specifically, the deck drive mechanism includes a second drive motor, and a second link mechanism which links the second drive motor and the deck cover 18 together. The second link mechanism transfers rotational power of the second drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame in the storage 4. The deck cover 18 in the retreated position is located further rearward and obliquely upward than in the home position, and uncovers the top opening of the storage 4. Thus, the deck cover 18 in the retreated position allows the retractable roof 11 to move between the use position and the retracted position.

<Lock Mechanism>

The lock mechanism 20 is attached to a front end of a lower surface (surface toward the inside of the cabin) of the front roof panel 13. The lock mechanism 20 includes a hook member (not shown) which is able to engage with a striker (not shown) fixed to a body (front header 3) of the vehicle 1. When the retractable roof 11 is in the use position, the hook member engages with the striker to lock the roof member 12 and the front header 3 together. The lock mechanism 20 is coupled to a lock drive mechanism mounted on a rear portion of the body of the vehicle 1 via a harness 24.

—Detailed Configuration of Rear End of Roof Member and its Periphery—

Figure 6:
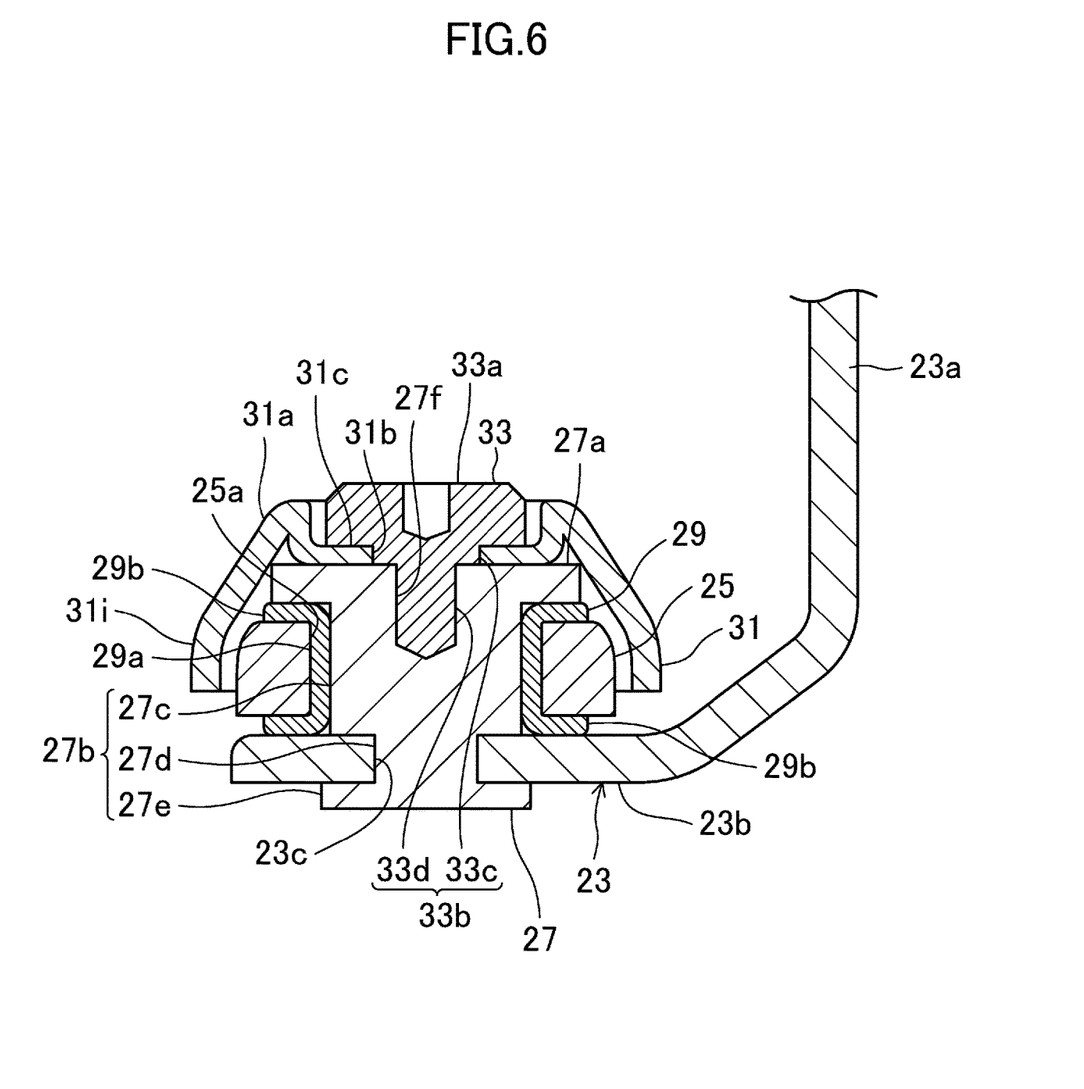
FIG. 6 is a cross-sectional view taken along line VI-VI shown in FIG. 4.

As can be seen in FIG. 6, a long, plate-like first link 25, which is made of metal and a component of the first link mechanism, is pivotally coupled to a front end of the coupling bracket 23 from the inside in the vehicle width direction, via a stepped rivet 27 and a metal bushing 29, with its face oriented in the vehicle width direction. An insertion hole 25a is formed through an end, toward the coupling bracket 23, of the first link 25. A cover attachment hole 25b is formed in a longitudinal middle portion of the first link 25. Further, at the longitudinal middle portion of the first link 25, an attachment tab 25c protrudes approximately at a right angle from a widthwise edge of the first link 25 toward the inside in the vehicle width direction. The attachment tab 25c is fastened to an end, in the vehicle width direction, of the middle roof panel 14. Thus, the first link 25 is disposed along the rear surface of the roof member 12.

The stepped rivet 27 has a head 27a and a shaft 27b. The shaft 27b has a large diameter portion 27c, a small diameter portion 27d, and an overhang portion 27e. The small diameter portion 27d has a smaller diameter than the large diameter portion 27c and is located across the large diameter portion 27c from the head 27a. The overhang portion 27e juts out of a tip end of the small diameter portion 27d. A fastening hole 27f is formed in a surface of the head 27a facing opposite to the shaft 27b to extend to the middle of the large diameter section 27c in an axial direction thereof.

The metal bushing 29 includes a cylindrical portion 29a, and a pair of round plate-like annular portions 29b respectively jutting out of both ends of the cylindrical portion 29a.

The overhang portion 27e of the stepped rivet 27 is joined (swaged) to an outer surface of the coupling bracket 23 in the vehicle width direction with the periphery of the front attachment hole 23c of the coupling bracket 23 sandwiched between the overhang portion 27e and the large diameter portion 27c. The small diameter portion 27d of the stepped rivet 27 is inserted in the front attachment hole 23c of the coupling bracket 23.

The large diameter portion 27c of the stepped rivet 27 is inserted in the insertion hole 25a of the first link 25 so as to pivotally support the first link 25. The periphery of the insertion hole 25a of the first link 25 is sandwiched between the head 27a of the stepped rivet 27 and the periphery of the front attachment hole 23c of the coupling bracket 23. The metal bushing 29 is interposed between the stepped rivet 27 and the first link 25 to be swaged to the first link 25, with the cylindrical portion 29a being inserted in the insertion hole 25a of the first link 25, and the periphery of the insertion hole 25a being sandwiched between the annular portions 29b in a thickness direction thereof.

Figure 7:
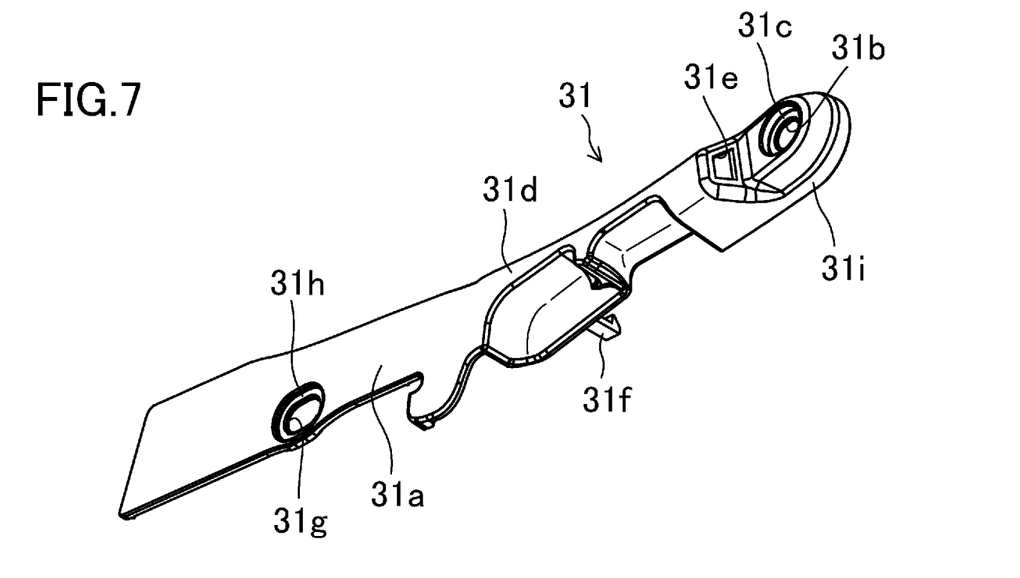
FIG. 7 is a front perspective view of the cover.
Figure 8:
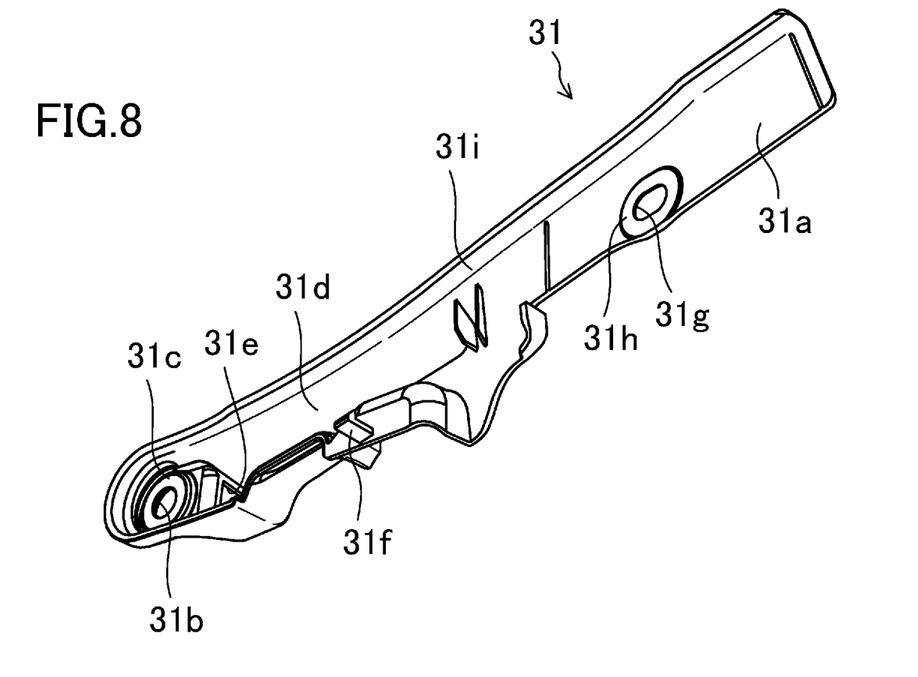
FIG. 8 is a rear perspective view of the cover.

A cover 31 made of resin is pivotally coupled to the stepped rivet 27 via a first stepped screw 33 such that the cover 31 covers the first link 25, except for its longitudinal end without the insertion hole 25a, from the inside in the vehicle width direction and the side opposite to the roof member 12 (from the inside of the cabin 2). The cover 31 includes, as also shown in FIGS. 7 and 8, a long, plate-like principal plane portion 31a whose face is substantially oriented in the vehicle width direction. A first round through hole 31b is formed through an end, toward the coupling bracket 23, of the principal plane portion 31a. The end of the principal plane portion 31a with the first through hole 31b has an edge rounded in the shape of U along the edge of the first through hole 31b. The periphery of the first through hole 31b constitutes a first bulge surface 31c protruding toward the outside in the vehicle width direction. Further, a bulge 31d protruding toward the inside in the vehicle width direction is formed between the first through hole 31b of the principal plane portion 31a and a substantial center in the longitudinal direction of the principal plane portion 31a. A harness insertion hole 31e is formed through a side surface of the bulge 31d toward the first through hole 31b. The harness 24 passes through the harness insertion hole 31e, and a portion of the harness 24 is housed between the bulge 31d and the first link 25. Further, a tab 31f protrudes toward the outside in the vehicle width direction from the principal plane portion 31a at a position closer to the first through hole 31b than the longitudinal center of the principal plane portion 31a and closer to the widthwise edge of the principal plane portion 31a toward the roof member 12. The tab 31f is caught on the edge of the first link 25 toward the roof member 12. In addition, a second through hole 31g elongated in the longitudinal direction of the principal plane portion 31a is formed through the principal plane portion 31a at a position opposite to the first through hole 31b with respect to the longitudinal center thereof. Inserting a screw 35 into the second through hole 31g fastens the cover 31 to the first link 25. The periphery of the second through hole 31g constitutes a second bulge surface 31h protruding toward the outside in the vehicle width direction. A continuous peripheral wall 31i protrudes toward the outside in the vehicle width direction from the principal plane portion 31a. Specifically, the peripheral wall 31i extends along both longitudinal ends of the principal plane portion 31a, one of the widthwise ends of the principal plane portion 31a opposite to the roof member 12, and a portion of the other widthwise end of the principal plane portion 31a closer to the roof member 12 and closer to the first through hole 31b, thereby covering an edge face of the first link 25.

The first stepped screw 33 includes a head 33a and a shaft 33b. The shaft 33b has a base end 33c, and a threaded portion 33d which is located across the base end 33c from the head 33a and has a smaller diameter than the base end 33c.

The threaded portion 33d of the first stepped screw 33 is inserted and fastened into the fastening hole 27f of the stepped rivet 27 from the inside in the vehicle width direction. The base end 33c is inserted in the first through hole 31b of the cover 31 to pivotally support the cover 31.

A second link 37, which is made of metal and a component of the first link mechanism, is pivotally coupled to a rear end of the coupling bracket 23 from the outside in the vehicle width direction. A second insertion hole (not shown) is formed in an end, toward the coupling bracket 23, of the second link 37. A second stepped screw (not shown) is inserted into the second insertion hole and the rear attachment hole of the coupling bracket 23 from the outside in the vehicle width direction. Thus, the second stepped screw is fastened to the rear attachment hole of the coupling bracket 23 and pivotally supports the second link 37.

—How to Attach First Link and Cover to Coupling Bracket—

To attach the first link 25 and the cover 31 to the coupling bracket 23, the stepped rivet 27, the metal bushing 29, the first stepped screw 33, and the screw 35 are prepared in addition to the coupling bracket 23, the first link 25, and the cover 31. At this time, the stepped rivet 27 has no overhang portion 27e, and an end thereof to be the overhang portion 27e is a cylindrical end continuous from the small diameter portion 27d. Further, the metal bushing 29 has only a single annular portion 29b, and an end thereof to be another annular portion 29b is a tubular end continuous with the cylindrical portion 29a.

The cylindrical portion 29a of the metal bushing 29 is inserted into the insertion hole 25a of the first link 25 through the end to be the annular portion 29b. Then, the end to be the annular portion 29b is plastically deformed to jut outward, thereby joining the annular portion 29b thus formed to the periphery of the insertion hole 25a of the first link 25. Thereafter, the first link 25 is placed on the coupling portion 23b of the coupling bracket 23 such that the cylindrical portion 29a of the metal bushing 29 (the insertion hole 25a of the first link 25) is aligned with the front attachment hole 23c of the coupling bracket 23. Then, the shaft 27b of the stepped rivet 27 is sequentially inserted into the cylindrical portion 29a of the metal bushing 29 joined to the first link 25 and the front attachment hole 23c of the coupling bracket 23. Then, a tip end of the shaft 27b of the stepped rivet 27, i.e., an end to be the overhang portion 27e, is plastically deformed to jut outward, thereby joining the overhang portion 27e thus formed to the periphery of the front attachment hole 23c of the coupling bracket 23.

Thereafter, the first bulge surface 31c of the cover 31 is brought into contact with the head 27a of the stepped rivet 27 such that the first through hole 31b of the cover 31 is aligned with the fastening hole 27f of the stepped rivet 27. Simultaneously, the second bulge surface 31h of the cover 31 is brought into contact with the first link 25 such that the second through hole 31g of the cover 31 is aligned with the cover attachment hole 25b of the first link 25, and the tab 31f of the cover 31 is caught on the edge of the first link 25. Then, the shaft 33b of the first stepped screw 33 is sequentially inserted into the first through hole 31b of the cover 31 and the fastening hole 27f, and the threaded portion 33d is fastened into the fastening hole 27f. The screw 35 is also inserted into the second through hole 31g and the cover attachment hole 25b, thereby fastening the cover 31 to the first link 25. As a result, the cover 31 is attached to the first link 25 such that the cover 31 is pivotally supported by the base end 33c of the first stepped screw 33.

—Operation of Opening/Closing Mechanism—

It will be described below how the opening/closing mechanism 10 performs an opening operation and a closing operation with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the lock mechanism 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members (not shown) so that they move together toward the storage 4 (see, e.g., FIG. 2). In this process, the first link 25 and the second link 37 pass by one another. When the front roof panel 13, the middle roof panel 14, and the back window 15 are all stored in the storage 4 in a folded state, the deck cover 18 in the retreated position returns to the home position (see FIG. 3). Thus, the cabin 2 is opened.

To close the open cabin 2, first, the deck cover 18 in the home position moves toward the retreated position. Then, the retractable roof 11 in the retracted position moves toward the use position.

Specifically, the front roof panel 13, the middle roof panel 14, and the back window 15 independently pivot via the plurality of link members so that they move together toward the cabin 2 (see, e.g., FIG. 2). Also in this process, the first link 25 and the second link 37 pass by one another. Thereafter, the retractable roof 11 reaches the use position, and the deck cover 18 in the retreated position returns to the home position (see FIG. 1). Thus, the cabin 2 is closed. The lock mechanism 20 then locks the front header 3.

As can be seen, according to this embodiment, the cover 31 is coupled to the first link 25 at the joint between the first link 25 and the coupling bracket 23 (front roof panel 13). Thus, the cover 31 can be attached to the first link 25 more stably and easily than the case where the cover 31 is attached to the first link 25 only at a point away from the joint between the first link 25 and the coupling bracket 23.

This configuration can reduce the point of attachment of the cover 31 to the first link 25 except for the joint between the first link 25 and the coupling bracket 23, thereby reducing the number of screws 35 exposed inside the cabin. This can improve the appearance of the cover 31 and its periphery.

Further, the resin cover 31 covering the first link 25 protects the passenger's head from hitting the first link 25 made of metal. This can ensure the safety of the passenger with reliability.

Additionally, the cover 31 partially covers the harness 24 so as not to expose the harness 24 inside the cabin. This can improve the appearance of the point where the harness 24 is arranged.

INDUSTRIAL APPLICABILITY

The present invention is useful as a structure of a cover which is attached to, and covers, a link pivotally coupled to a roof panel which opens and closes the top of a cabin of a convertible.

DESCRIPTION OF REFERENCE CHARACTERS

1 Vehicle (Convertible)
13 Front Roof Panel
23c Front Attachment Hole
25 First Link
25a Insertion Hole
27 Stepped Rivet
27a Head
27b Shaft
27c Large Diameter Portion
27d Small Diameter Portion
27e Overhang Portion
27f Fastening Hole
31 Cover
31b First Through Hole
33 First Stepped Screw
33a Head
33b Shaft
33c Base End
33d Threaded Portion

The invention claimed is:

1. A structure of a cover which is attached to, and covers, a link pivotally coupled to a roof panel which opens and closes a top of a cabin of a convertible, wherein
    an attachment hole is formed through a coupling bracket,
    an insertion hole is formed through an end of the link,
    a through hole is formed through an end of the cover,
    the link is pivotally coupled to the roof panel via a stepped rivet, and the cover is pivotally coupled to the stepped rivet via a stepped screw,
    the stepped rivet includes a head, and a shaft having a large diameter portion, a small diameter portion, and an overhang portion, the small diameter portion having a smaller diameter than the large diameter portion and being located across the large diameter portion from the head, the overhang portion jutting out of a tip end of the small diameter portion, the head being provided with a fastening hole formed in a surface thereof facing opposite to the shaft,
    the stepped screw has a shaft including a base end, and a threaded portion located across the base end from a head, the threaded portion having a smaller diameter than the base end,
    the overhang portion of the stepped rivet is joined to the roof panel with a periphery of the attachment hole of the coupling bracket being sandwiched between the overhang portion and the large diameter portion, and the large diameter portion being inserted in the insertion hole of the link to pivotally support the link, and
    the threaded portion of the stepped screw is fastened into the fastening hole of the stepped rivet, and the base end of the stepped screw is inserted in the through hole of the cover to pivotally support the cover.

* * * * *